June 6, 1961 H. L. MORRILL, JR 2,987,115
SWIVEL SEAT FOR AUTOMOBILES
Filed Dec. 7, 1959 2 Sheets-Sheet 1

INVENTOR
HARRY L. MORRILL, JR.

BY Kimmel & Crowell
ATTORNEYS

June 6, 1961  H. L. MORRILL, JR  2,987,115
SWIVEL SEAT FOR AUTOMOBILES
Filed Dec. 7, 1959  2 Sheets-Sheet 2

INVENTOR
HARRY L. MORRILL, JR.

BY
Kimmel & Crowell
ATTORNEYS

United States Patent Office 2,987,115
Patented June 6, 1961

2,987,115
SWIVEL SEAT FOR AUTOMOBILES
Harry L. Morrill, Jr., Atlanta, Ga. (Trails End Road, Marietta, Ga.)
Filed Dec. 7, 1959, Ser. No. 857,731
4 Claims. (Cl. 155—182)

This invention relates to a swivel seat for automobiles, and constitutes an improvement over my Patent No. 2,811,199, entitled "Automobile Seat," dated October 29, 1957.

A primary object of the invention is the provision of an improved automobile seat which permits the driver or occupant to readily get into and out of the seat of an automobile, or other vehicle, without difficulty or discomfort.

An additional object of the invention is the provision of a rotatable seat section which swivels with the body of the user, to turn toward the side of the vehicle when the occupant wishes to get in or out of the seat of the vehicle.

An additional object of the invention is the provision of a detachable or readily removable auxiliary seat of this character which does not interfere with the comfort or safety of the driver or occupant of the vehicle, and which doe not detract from the appearance of the upholstery.

A further and more specific object of the invention is the provision of such a seat which is provided with a relatively rigid frame, which is fabric or otherwise covered, and which has a relatively sticky or tacky underside which causes the device to adhere to the conventional upholstered seat of the vehicle. This seat portion is provided with a swivelable pad, which is provided with a depending skirt, the pad being adapted to swivel on the underlying seat section with the bodily movements of the occupant of the vehicle, so as to swing toward and away from the door under the impetus of bodily movement.

Still another object of the invention is the provision of a device of this character which is sturdy and durable in construction, reliable and efficient in operation, and relatively simple and inexpensive to manufacture, assemble and utilize.

Still other objects will in part be obvious, and in part be pointed out as the description of the invention proceeds, and shown in the accompanying drawings wherein there is disclosed a preferred embodiment of this inventive concept.

In the drawings.

Similar reference characters refer to similar parts throughout the several views of the drawing.

Figure 1:
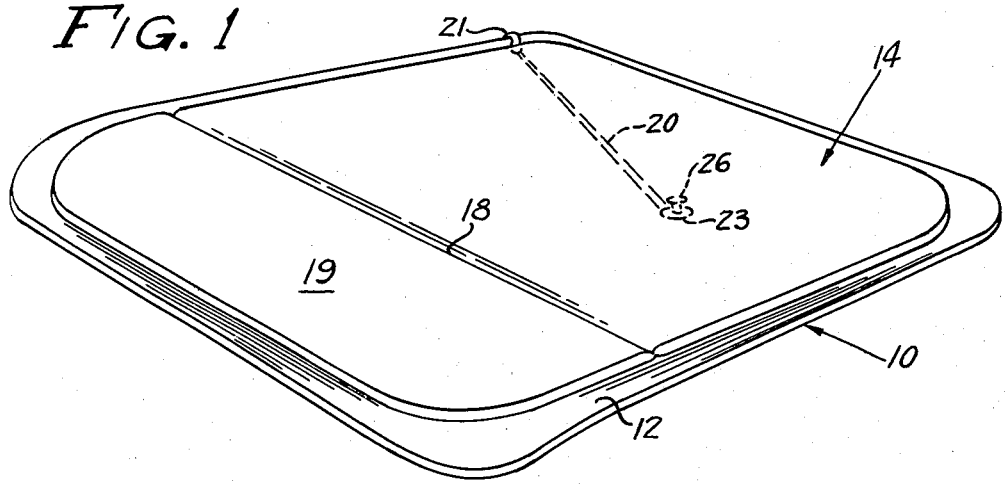
FIGURE 1 is a perspective view showing one form of device embodying the instant inventive concept in one position of adjustment.

Having reference now to the drawing in detail and more particularly to the species of the invention shown in FIGURES 1 to 4 inclusive, there is generally indicated at 10 a base, which includes a generally rectangular frame member 11 comprised of metal or the like, which is provided with a covering having an upper slick surface 12, and a lower surface 13 which is preferably covered with a tacky material. The base is adapted to be positioned on the seat of a motor vehicle, such as the driver's seat, the tacky surface 13 causing the device to adhere releasably to the seat in substantially slip-proof relation.

Figure 2:
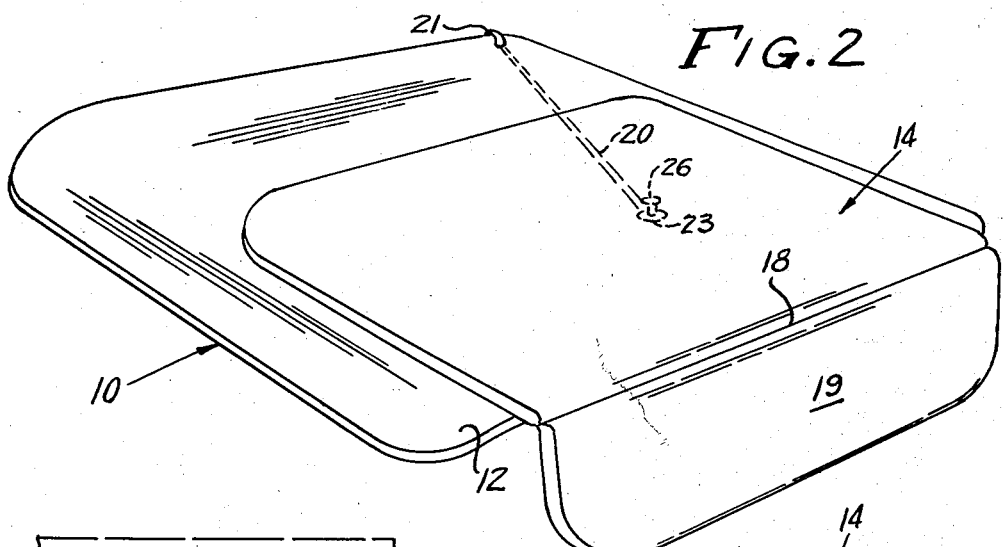
FIGURE 2 is a view similar to FIGURE 1, but showing the parts in a different position of adjustment.
Figures 3, 4:
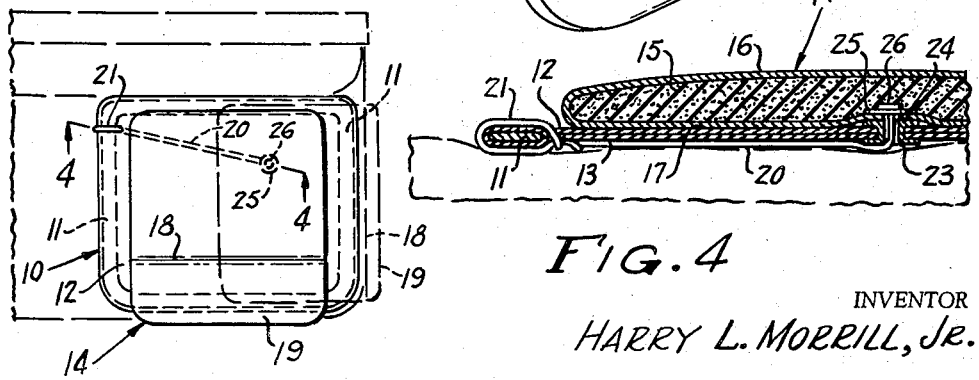
FIGURE 3 is a reduced plan view showing the device of the instant invention in full lines in one position of adjustment, the alternative position of adjustment being indicated in dotted lines.
FIGURE 4 is an enlarged sectional view taken substantially along the line 4—4 of FIGURE 3, as viewed in the direction indicated by the arrows.

Pivotally secured to the base 10 is a cushion, generally indicated at 14, which is comprised of an interior padding 15, of foam rubber or the like, and a covering 16, the under surface 17 of which is preferably a slick surfaced material to enable the same to slide on the slick upper surface 12 of base 10. The cushion 14 is provided with a fold line 18, which defines a flap portion 19 which when the device is in the position of FIGURE 1, that is, driving position, lies flush with the base 10. The arrangement is such that, however, when the cushion 14 is turned toward the door, the flap 19 lies in depending relation over the end of the seat, as best shown in FIGURE 2. Cushion 14 is attached to base 10 in pivotal relation, and, in the illustrative embodiment of the invention shown, such attaching means take the form of a cord 20, which is looped as at 21 over the metallic frame member 11. The cord extends beneath the bottom surface 13 of the base, as shown in FIGURE 4, or may, alternatively, extend between the top layer 12 and the bottom layer 13 of the base if desired, to a grommet 23 which is positioned in an off-center location adjacent the outer rear portion of the base 10. The cord 20 extends through the grommet 23 and through a suitable opening 24 in the under covering 17 of cushion 14, and through a washer or collet 25 to a tie head 26 for securing the parts in related assembly. By virtue of the arrangement shown, it will be understood that the slippery or slick under surfaces 17 of cushion 14 slides on the slick upper surface 12 of base 10 with a minimum of friction, so that the device may be readily turned to either driving position, as shown in FIGURE 1, or the egress or ingress position shown in FIGURE 2.

Figure 5:
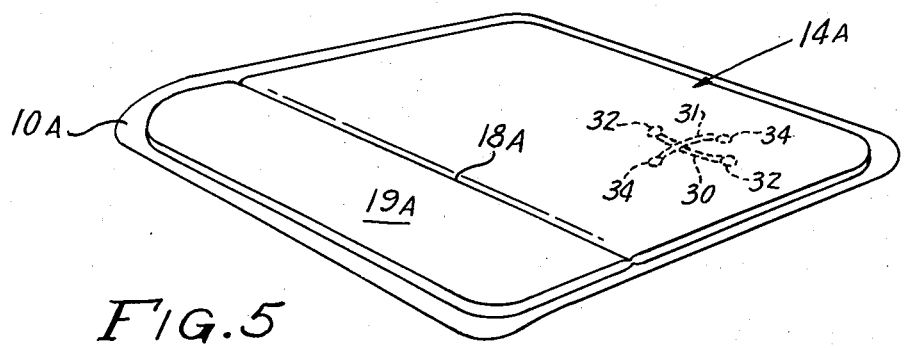
FIGURE 5 is a perspective view of a modified form of device shown in one position of adjustment.
Figure 6:
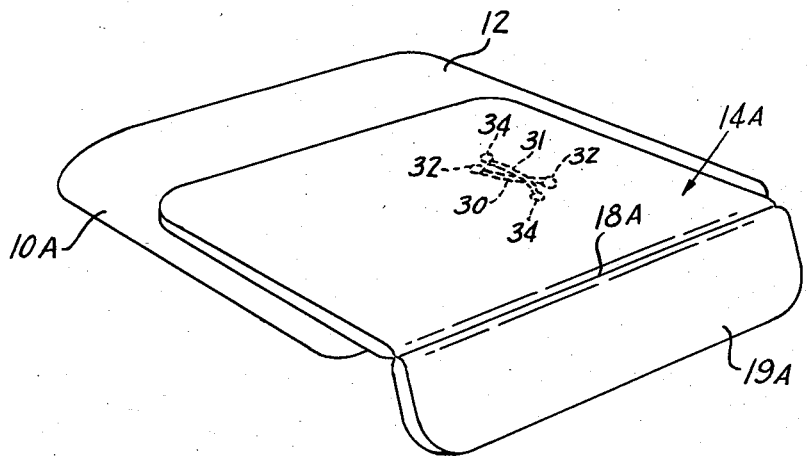
FIGURE 6 is a view showing the structure of FIGURE 5 in a different position of adjustment.
Figure 7:
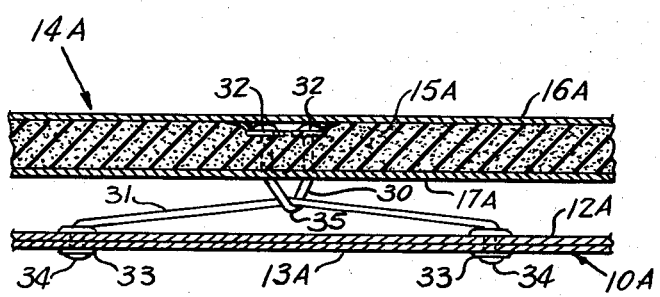
FIGURE 7 is an enlarged sectional view showing the connecting means for the structure shown in FIGURES 5 and 6.

Referring now to the modifications shown in FIGURES 5, 6 and 7, there is provided a base 10A, which is substantially identical to the previously described base 10, and which includes a similar metal frame (not shown). The base 10A has an upper smooth surface 12A, and a lower tacky surface 13A, and has secured thereto a seat cushion, generally indicated at 14A, which includes a slick under surface 17A which comprises a part of a cover 16A which surrounds a cushion or padding 15A substantially identical to the previously described modification. This cushion is also provided with a fold line 18A forming a depending flap 19A.

In this form of the invention, the means for securing the cushion 14A to the base 10A take the form of a pair of crossed cords 30 and 31. Cord 30 has its ends extended through suitable openings in pad 15A, and secured to buttons 32, which are positioned beneath the top covering layer 16A. The ends of cord 31 extend through two spaced apart grommets 33 which extend through base 10A, and are provided with buttons or enlarged heads 34 for securing the ends in related assembly with the base. The cords cross, as at 35, and provide a flexible pivot which is located toward the rear and outer side of the base, permitting the cushion to swing from the position of FIGURE 5 to the position of FIGURE 6, as described in the previous modification.

The cords 30 and 31 are preferably slick or smooth surfaced to facilitate the sliding movement between the under surface 17A of cushion 14A and the slick top surface 12A of base 10A.

Obviously if desired, the two cords 30 and 31 may be supplanted by a single cord twisted or knotted at 35, and the heads or buttons 32 and 34 may be omitted, with the ends of the cord extending between the grommets 33, and across the top of the space within which the heads 32 are positioned.

From the foregoing it will now be seen that there is herein provided a swivel seat attachment for automobiles which accomplishes all of the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative, and not in a limiting sense.

I claim:

1. A swivel seat attachment for vehicle seats comprising a base formed of a frame and a covering for said frame, a cushion pivotally mounted on said covering for pivotal movement toward and away from the door of the vehicle, said covering having a relatively slick upper surface to facilitate pivotal movement of said cushion, the underside of said cushion also having a slick surface, said pivotal mounting for the cushion being positioned at an off center point toward the rear and outer side of the base whereby a portion of said cushion extends outwardly over the side of the base when turned toward the door, a fold line on said cushion to permit the extending portion of said cushion to drop and form a depending flap, said pivotal mounting for said cushion on said base comprising a cord having one end secured to said frame, the other end extending beneath said base and upwardly through an opening in said covering and being secured to said cushion.

2. A swivel seat attachment for vehicle seats comprising a base formed of a frame and a covering for said frame, a cushion pivotally mounted on said covering for pivotal movement toward and away from the door of the vehicle, said covering having a relatively slick upper surface to facilitate pivotal movement of said cushion, the underside of said cushion also having a slick surface, said pivotal mounting for the cushion being positioned at an off center point toward the rear and outer side of the base whereby a portion of said cushion extends outwardly over the side of the base when turned toward the door, a fold line on said cushion to permit the extending portion of said cushion to drop and form a depending flap, said pivotal mounting for said cushion on said base comprising a pair of crossed cords, one having its ends secured to said cushion and the other having its ends secured to said base, permitting limited lateral play of said cushion relative to said base.

3. A swivel seat attachment for vehicle seats comprising a base formed of a frame and a covering for said frame, a cushion pivotally mounted on said covering for pivotal movement toward and away from the door of the vehicle, said covering having a relatively slick upper surface to facilitate pivotal movement of said cushion, the underside of said cushion also having a slick surface, said pivotal mounting for the cushion being positioned at an off center point toward the rear and outer side of the base whereby a portion of said cushion extends outwardly over the side of the base when turned toward the door, a fold line on said cushion to permit the extending portion of said cushion to drop and form a depending flap, the pivotal mounting for said cushion on said base comprising interconnected cord means securing said cushion to said base and permitting limited lateral movement of said cushion relative to said base.

4. A swivel seat attachment for vehicle seats comprising a base formed of a frame and a covering for said frame, a cushion pivotally mounted on said covering for pivotal movement toward and away from the door of the vehicle, said covering having a relatively slick upper surface to facilitate pivotal movement of said cushion, the underside of said cushion also having a slick surface, said pivotal mounting for the cushion being positioned at an off center point toward the rear and outer side of the base whereby a portion of said cushion extends outwardly over the side of the base when turned toward the door, a fold line on said cushion to permit the extending portion of said cushion to drop and form a depending flap, said cushion having a pair of spaced openings therein, said covering also having a pair of spaced openings therein, said pivotal mounting comprising cord means extending between said spaced openings in said cushion and said spaced openings in said covering and crossed between said cushion and said covering to permit limited lateral play of said cushion relative to said base.

References Cited in the file of this patent

UNITED STATES PATENTS

| Re. 24,805 | Morrill | Mar. 29, 1960 |
| 1,444,521 | Pearl | Feb. 6, 1923 |
| 1,827,124 | Trudo | Oct. 13, 1943 |
| 2,662,233 | Cheesman | Dec. 15, 1953 |

FOREIGN PATENTS

| 87,851 | Sweden | Nov. 10, 1936 |